United States Patent [19]
Yamazaki

[11] Patent Number: 5,824,142
[45] Date of Patent: Oct. 20, 1998

[54] INK COMPOSITION, PROCESS FOR ITS PREPARATION, AND INK-JET RECORDING PROCESS

[75] Inventor: Hideto Yamazaki, Nagoya, Japan

[73] Assignee: Brother Kogyo Kabushiki Kaisha, Nagoya, Japan

[21] Appl. No.: 677,967

[22] Filed: Jul. 10, 1996

[30] Foreign Application Priority Data

Jul. 17, 1995 [JP] Japan .................................. 7-180095

[51] Int. Cl.⁶ ................................................... C09D 11/02
[52] U.S. Cl. .................. 106/20 R; 106/22 B; 106/22 H; 106/20 A; 106/20 D
[58] Field of Search ............................ 106/20 R, 20 D, 106/20 A, 22 B, 22 H

[56] References Cited

U.S. PATENT DOCUMENTS

| | | | |
|---|---|---|---|
| 4,279,653 | 7/1981 | Makishima et al. | 106/22 R |
| 4,489,334 | 12/1984 | Owatari | 106/22 C |
| 5,016,028 | 5/1991 | Temple | 346/140 R |
| 5,092,926 | 3/1992 | Owatari | 106/20 B |

FOREIGN PATENT DOCUMENTS

| | | |
|---|---|---|
| A-53-20882 | 6/1978 | Japan . |
| A-2-97578 | 4/1990 | Japan . |
| 2-150355 | 6/1990 | Japan . |

*Primary Examiner*—Helene Klemanski
*Attorney, Agent, or Firm*—Oliff & Berridge

[57] ABSTRACT

An ink composition comprising a dye or a pigment, dissolved or dispersed in an aqueous medium, and having nitrates and nitrites in a total content less than 5 ppm.

9 Claims, No Drawings

INK COMPOSITION, PROCESS FOR ITS PREPARATION, AND INK-JET RECORDING PROCESS

BACKGROUND OF THE INVENTION

1. Field of the Invention

This invention relates to an ink composition suited for ink-jet recording, a process for its preparation, and an ink-jet recording process making use of the ink composition.

2. Description of the Related Art

Ink-jet recording is a system in which ink droplets are formed by ink ejection methods of various types (e.g., a system in which mechanical vibration or displacement is imparted to ink by the use of a piezoelectric device, and a system in which ink is heated to cause it to bubble and a pressure produced when it bubbles is utilized), and part or the whole of them is caused to adhere to recording mediums such as paper to make a record.

As ink compositions used in such ink-jet recording systems, those prepared by dissolving or dispersing a water-soluble dye or a pigment in water or an aqueous medium comprising water and a water-soluble organic solvent are known and put into use. Such ink compositions are required to have various performances most suited for what they are used. For example, they are required to cause no precipitation or aggregation even when unused for a long period of time, to cause no clogging at nozzles and in ink channels of the head of an ink-jet printer and to ensure good print quality.

All such ink-jet recording systems utilize the principle of printing by compressing a liquid ink. Hence, when bubbles or bubble nuclei are present at the part where the pressure is produced in ink-jet printers, the pressure produced is absorbed in bubbles to make it impossible to apply a sufficient pressure to the ink, finally making it impossible to perform ink jetting. For that reason, conventionally, ink compositions for ink-jet recording are deaerated in the final step of their manufacture, or subjected to high-precision filtration to remove the bubble nuclei and thereafter put in containers having a low gas permeability.

Such treatment can be effective at the initial stage, but becomes less effective with time. Especially when containers that hold ink are kept to stand in an environment of high temperature, the ink itself may generate gases to produce bubbles even if it has been kept gas-free at the initial stage, and the bubbles may cause blank dots which are fatal to ink-jet printers. In general, in ink compositions for ink-jet recording, the phenomenon of cavitation occurs with the generation of pressure, and the gases remaining in the ink may form bubbles. Accordingly, as disclosed in Japanese Patent Application Laid-open No. 52-74406, it is attempted to add a sulfite to ink to reduce the dissolved oxygen in the ink so that the gas concentration in the ink is decreased. This, however, can not be effective at all against nitrogen gas. Moreover, it is reported in Japanese Patent Application Laid-open No. 2-97578 that the nitrogen gas concentration in ink increases with time even if the dissolved oxygen gas has been completely kept removed at the initial stage and the ink is hermetically sealed in containers having a low gas permeability. Hence, the occurrence of bubbles in ink can not be prevented unless the nitrogen gas is prevented from occurring from the ink itself. Accordingly, ink compositions for ink-jet recording have been limited in environmental temperature or have had a short ink service duration, and there have been great restrictions when transported, when stored and when used.

SUMMARY OF THE INVENTION

Objects of the present invention are to solve the above problems to provide an ink composition having a high printing stability, that may cause no gases before the formation of bubbles even if the ink composition is kept to stand in an environment of high temperature, and hence may cause no blank dots when used, and to provide a process for its preparation, and an ink-jet recording process making use of the ink composition.

To achieve these objects, the present invention provides an ink composition comprising a dye or a pigment, dissolved or dispersed in an aqueous medium; the ink composition having nitrates and nitrites in a total content less than 5 ppm.

The present invention also provides a process for preparing an ink composition comprising a dye or a pigment, dissolved or dispersed in an aqueous medium; the process comprising the steps of dissolving or dispersing the dye or pigment in the aqueous medium, and subjecting the resulting solution or dispersion to anion exchange or ultrafiltration so that the ink composition has nitrates and nitrites in a total content less than 5 ppm.

The present invention still also provides an ink-jet recording process carried out by jetting an ink composition to a recording medium in the form of droplets to make a record; the ink composition comprising a dye or a pigment, dissolved or dispersed in an aqueous medium, and having been controlled to have nitrates and nitrites in a total content less than 5 ppm.

These and other features and advantages of the present invention are described in or will become apparent from the following detailed description of the preferred embodiments.

DESCRIPTION OF THE PREFERRED EMBODIMENTS

The ink composition of the present invention is so controlled that the total content of nitrates and nitrites contained therein is less than 5 ppm. This makes it possible to realize an ink composition having a high printing stability, that may cause no gases before the formation of bubbles even if the ink composition is kept to stand in an environment of high temperature, and hence may cause no blank dots when used.

Basic components that make up the ink composition of the present invention will be described below.

The basic components such as the dye or pigment and the aqueous medium that make up the ink composition of the present invention are known per se, and those conventionally used in ink compositions for ink-jet recording may be used.

For example, the dye may include water-soluble dyes as typified by direct dyes, acid dyes, basic dyes and reactive dyes.

In conventional ink compositions, such dyes are commonly used in such a proportion that the dye holds about 0.1 to 20% by weight in the ink composition. In the present invention, the dye may be used within such a range as a matter of course, and may also be used in an amount more than that conventionally applied. Even when used in such an amount, the ink composition can be stable and may cause no deposits. Pigments may be contained in the ink composition in an amount of from 0.1% by weight to 20% by weight based on the total weight of the ink composition.

The aqueous medium used in the ink composition of the present invention is water, or a mixed solvent of water and a water-soluble organic solvent. Particularly preferably, it may be a mixed solvent of water and a water-soluble organic solvent. The water-soluble organic solvent includes those containing a polyhydric alcohol, having a ink-dry preventive effect. As the water, it is preferable to use not commonly available water containing various ions, but deionized water.

The water-soluble organic solvent used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone. Of these, glycerol, alkylene glycols such as diethylene glycol, and lower alkyl ethers of polyhydric alcohols such as triethylene glycol monoethyl ether are particularly preferred.

The water-soluble organic solvent may be contained in the ink composition in an amount of usually from 0 to 95% by weight, preferably from 10 to 80% by weight, and more preferably from 20 to 50% by weight, based on the total weight of the ink composition.

When this water-soluble organic solvent is used, the content of the water may be determined within a vast range, depending on the type of component of the water-soluble organic solvent, the composition thereof and the desired properties of ink, and may be within the range of usually from 10 to 95% by weight, preferably from 10 to 70% by weight, and more preferably from 20 to 70% by weight, based on the total weight of the ink composition.

The ink composition of the present invention is basically constituted as described above. Besides, various conventionally known additives such as dispersants, surfactants, viscosity modifiers, surface tension modifiers, pH adjusters and antifungal agents may be optionally added. For example, viscosity modifiers such as polyvinyl alcohol, celluloses and water-soluble resins, surfactants of various types such as cationic, anionic and nonionic types, and pH adjusters such as diethanolamine and triethanolamine. When an ink composition is prepared which is used in an ink-jet recording process of the type a recording solution is charged, a specific resistance modifier including inorganic salts such as ammonium chloride is added.

The process for preparing the ink composition of the present invention will be specifically described below.

In the present invention, first, the dye or pigment is dissolved or dispersed in the aqueous medium by a conventional method. Next, the solution or dispersion thus obtained are passed through an anion-exchange resin to absorb and remove the nitrates and nitrites. Alternatively, the solution or dispersion is passed through an ultrafiltration membrane to separate and remove the nitrates and nitrites. The nitrates and nitrites in the solution or dispersion are removed in this way, and, before the resulting composition is provided as the ink composition, the content of nitrates and nitrites in the composition is measured by ion chromatography to confirm whether it is less than 5 ppm. The ink composition obtained is optionally further deaerated, and is preferably hermetically sealed in containers having a low gas permeability.

As commonly available methods for removing nitrites or the like, the sulfamic acid neutralization is known in the art. Such a method, however, is not preferable because it is difficult to control the total content of nitrates and nitrites to be less than 5 ppm and sulfates may also remain in the ink composition.

In the foregoing, a typical method for controlling the total content of nitrates and nitrites in the ink composition is shown. Methods for such control are by no means limited to this method, and all methods can be effectively used so long as they are methods by which the nitrates and nitrites in an ionized form can be removed.

The sources from which the nitrates and nitrites as impurities are the dye. Besides it, water used and additives such as a surfactants and a water-soluble resin are considered as the sources. As to the water, distilled water, ion-exchanged water or the like may be used as the water used for the ink composition, whereby the nitrates and nitrites can be prevented from entering. As for the surfactants, those other than nitrates and nitrites, e.g., nonionic surfactants may be used, whereby the nitrates and nitrites can be prevented from entering. With regard to the water-soluble resin, some water-soluble resins and so forth are those in which nitrates and nitrites has entered when they are produced. Such resins and so forth may also be treated by the same purification procedure as the above to remove nitrates and nitrites, and thereafter may be used as the additives. The greatest source from which the nitrates and nitrites comes is the dye used. The nitrates and nitrites are often contained in a very large quantity especially in the case when dyes are commercially available products. In some examples of analyses, their content is known to reach thousands ppm in a dye powder.

In the foregoing, the removal of the nitrates and nitrites contained in the ink composition has been chiefly described. In practice, together with the removal of nitrates and nitrites, it is preferable to also remove iron, calcium, barium and so forth.

The ink composition of the present invention, obtained in the manner as described above, has well solved the problems involved in the prior art, and is for itself advantageous as having well balanced performances in respect of all of recording performances in ink-jet recording (e.g., signal response, stability in droplet formation, long-time continuous recording performance, and ink ejection stability after long-time pause), storage stability, fixing performance to recording mediums, recorded image light-fastness, water resistance and so forth. It can be useful as ink compositions for ink-jet recording of various systems, and can be preferable especially as an ink composition for the ink-jet recording system in which the ink composition is jetted in the form of droplets by utilizing the vibration of a piezoelectric device and also as an ink composition for the ink-jet recording system in which the ink composition is jetted in the form of droplets by utilizing the action of heat energy, the latter being easily affected by the formation of deposits. The present ink composition can also enjoy superior recording.

EXAMPLES

The present invention will be further described below by giving Examples and Comparative Examples.

Example 1

To 69 parts by weight of pure water, 3 parts by weight of a commercially available dye DAIWA BLACK MSC (trade name; available from Daiwa Chemical Co., Ltd.) and 20 parts by weight of glycerol were added, followed by stirring to obtain an ink composition. This ink composition was passed through an anion-exchange resin AMBERITE IRA-410 (trade name; available from Organo Co., Ltd.), and its total content of nitrates and nitrites was measured by ion chromatography to reveal that it was 3.0 ppm. This ink composition was filtered with a membrane filter of 0.5 $\mu$m in pore diameter, and then deaerated. Thereafter, an aluminum-laminated polyethylene bag having a low gas permeability was filled with this composition, and was in-liquid sealed with polyethylene to obtain an ink bag in which the ink composition was hermetically sealed. This ink bag was left to stand in an environment of 70° C. for 20 days, and thereafter the nitrogen concentration was measured by gas chromatography to reveal that it was 5.2 ppm.

Using this ink composition, the following T1 and T2 were examined on an ink-jet printer having an on-demand type multi-head that performs recording by imparting heat energy to the ink in the recording head to produce ink droplets (ejection orifice diameter: 35 $\mu$m; heating resistor resistance value: 150 ohms; drive votage: 30 V; frequency: 2 KHz), to find that good results were obtained in all the cases as noted below together.

(T1) Ejection stability: The ink composition was continuously ejected in an atmosphere of 5° C., 20° C. or 40° C., for 24 hours for each. Always stable, high-quality recording was performed in all atmospheres.

(T2) Ejection response: Intermittent ejection at intervals of 1 minute and ejection after leaving for 2 months were examined. In both instances, no clogging occurred at the nozzles or ink channels of the ink-jet printer head, and stable and uniform recording was performed.

Comparative Example 1

An ink composition was prepared in the same manner as in Example 1 except that the composition was not passed through the anion-exchange resin. As a result, the total content of nitrates and nitrites in the ink composition was 8.5 ppm. Using this ink composition, its performances were examined in the same manner as in Example 1. As a result, after the ink bag was left to stand in an environment of 70° C. for 20 days, the nitrogen concentration was 15.0 ppm. In respect of T1, the ink often failed to be ejected.

Example 2

To 22 parts by weight of pure water, 50 parts by weight (dye content: 5 parts by weight) of a commercially available dye RABACELL FAST YELLOW R LIQUID (trade name; available from Bayer Japan Ltd.), 20 parts by weight of ethylene glycol and 8 parts by weight of diethylene glycol monobutyl ether were added, followed by stirring to obtain an ink composition. This ink composition was passed through an ultrafiltration membrane HF1-43-PM1 (trade name; available from Romicon Co., Ltd.), and its total content of nitrates and nitrites was measured by ion chromatography to reveal that it was 4.3 ppm. This ink composition was filtered with a membrane filter of 0.5 $\mu$m in pore diameter, and then deaerated. Thereafter, an aluminum-laminated polyethylene bag having a low gas permeability was filled with this composition, and was in-liquid sealed with polyethylene to obtain an ink bag in which the ink composition was hermetically sealed. This ink bag was left to stand in an environment of 70° C. for 20 days, and thereafter the nitrogen concentration was measured by gas chromatography to reveal that it was 6.3 ppm.

Using this ink composition, its performances were examined in the same manner as in Example 1. As a result, like Example 1, good results were obtained.

Comparative Example 2

An ink composition was prepared in the same manner as in Example 2 except that the composition was not passed through the ultrafiltration membrane. As a result, the total content of nitrates and nitrites in the ink composition was 9.0 ppm. Using this ink composition, its performances were examined in the same manner as in Example 1. As a result, after the ink bag was left to stand in an environment of 70° C. for 20 days, the nitrogen concentration was 20.2 ppm. In respect of T1, the ink often failed to be ejected. In respect of T2, stable ejection became impossible after leaving for 2 months.

Example 3

To 78 parts by weight of pure water, 2 parts by weight of a commercially available dye CYRUS SUPRARED F3B (trade name; available from Bayer Japan Ltd.), 15 parts by weight of propylene glycol and 5 parts by weight of diethylene glycol monobutyl ether were added, followed by stirring to obtain an ink composition. This ink composition was passed through an anion-exchange resin AMBERITE IRA-410 (trade name; available from Organo Co., Ltd.), and its total content of nitrates and nitrites was measured by ion chromatography to reveal that it was 1.0 ppm. This ink composition was filtered with a membrane filter of 0.5 $\mu$m in pore diameter, and then deaerated. Thereafter, an aluminum-laminated polyethylene bag having a low gas permeability was filled with this composition, and was in-liquid sealed with polyethylene to obtain an ink bag in which the ink composition was hermetically sealed. This ink bag was left to stand in an environment of 70° C. for 20 days, and thereafter the nitrogen concentration was measured by gas chromatography to reveal that it was 3.3 ppm.

Using this ink composition, its performances were examined in the same manner as in Example 1. As a result, like Example 1, good results were obtained.

Comparative Example 3

An ink composition was prepared in the same manner as in Example 3 except that the composition was not passed through the anion-exchange resin. As a result, the total content of nitrates and nitrites in the ink composition was 6.8 ppm. Using this ink composition, its performances were examined in the same manner as in Example 1. As a result, after the ink bag was left to stand in an environment of 70° C. for 20 days, the nitrogen concentration was 10.5 ppm. In respect of T1, the ink often failed to be ejected.

Example 4

To 60.3 parts by weight of pure water, 16.7 parts by weight (dye content: 2.5 parts by weight) of a commercially available dye RABACELL FAST BLUE HS LIQUID (trade name; available from Bayer Japan Ltd.), 10 parts by weight of glycerol, 5 parts by weight of ethylene glycol and 8 parts by weight of diethylene glycol monobutyl ether were added, followed by stirring to obtain an ink composition. This ink composition was passed through an ultrafiltration membrane HF1-43-PM1 (trade name; available from Romicon Co., Ltd.), and its total content of nitrates and nitrites was measured by ion chromatography to reveal that it was 2.0 ppm. This ink composition was filtered with a membrane filter of 0.5 μm in pore diameter, and then deaerated. Thereafter, an aluminum-laminated polyethylene bag having a low gas permeability was filled with this composition, and was in-liquid sealed with polyethylene to obtain an ink bag in which the ink composition was hermetically sealed. This ink bag was left to stand in an environment of 70° C. for 20 days, and thereafter the nitrogen concentration was measured by gas chromatography to reveal that it was 4.6 ppm.

Using this ink composition, its performances were examined in the same manner as in Example 1. As a result, like Example 1, good results were obtained.

Comparative Example 4

An ink composition was prepared in the same manner as in Example 4 except that the composition was not passed through the ultrafiltration membrane. As a result, the total content of nitrates and nitrites in the ink composition was 9.0 ppm. Using this ink composition, its performances were examined in the same manner as in Example 1. As a result, after the ink bag was left to stand in an environment of 70° C. for 20 days, the nitrogen gas content was 14.3 ppm. In respect of T1, the ink often failed to be ejected. In respect of T2, stable ejection became impossible after leaving for 2 months.

In the ink compositions of Examples 1 to 4, which generated nitrogen gas only in a small quantity, showed good ejection stability and also showed a good ejection response, the total content of nitrates and nitrites in the ink composition was less than 5 ppm in all the cases.

On the other hand, in the ink compositions of Comparative Examples 1 to 4, which generated nitrogen gas in a large quantity and caused problems in ejection stability and ejection response, the total content of nitrates and nitrites in the ink composition was 5 ppm or more in all the cases.

As described above, in Examples 1 to 4, since the the total content of nitrates and nitrites in the ink composition is less than 5 ppm, ink compositions generating less nitrogen gas and having superior ejection stability and ejection response can be obtained.

In Examples 1 to 4 and Comparative Examples 1 to 4, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples 1 to 4. As a result, similar results were obtained.

Thus, according to the ink compositions of the present invention, since the total content of nitrates and nitrites in the ink composition is less than 5 ppm, nitrogen gas may less occur, and, in ink-jet recording apparatus making use of such ink compositions, ink can be well jetted without causing the blank dots.

What is claimed is:

1. An ink composition comprising a dye or a pigment, dissolved or dispersed in an aqueous medium, wherein said ink composition contains nitrates, and wherein a total content of nitrates and nitrites in the ink composition is less than 5 ppm.

2. The ink composition according to claim 1, wherein said dye or pigment is contained in an amount of from 0.1% by weight to 20% by weight based on the total weight of the ink composition.

3. The ink composition according to claim 1, wherein said aqueous medium is a mixed solvent of water and a water-soluble organic solvent.

4. The ink composition according to claim 3, wherein said water is deionized water.

5. A process for preparing an ink composition comprising a dye or a pigment, dissolved or dispersed in an aqueous medium, said process comprising the steps of:

dissolving or dispersing the dye or pigment in the aqueous medium; and subjecting the resulting solution or dispersion to anion exchange or ultrafiltration, wherein the ink composition contains nitrates, and wherein a total content of nitrates and nitrites in the ink composition is less than 5 ppm.

6. The preparation process according to claim 5, which further comprises the step of deaeration to remove gases dissolved in the ink composition.

7. An ink-jet recording process comprising jetting an ink composition to a recording medium in the form of droplets to make a record, said ink composition comprising a dye or a pigment, dissolved or dispersed in an aqueous medium, the ink composition containing nitrates, and the ink composition having been controlled to contain nitrates and nitrites in a total content less than 5 ppm.

8. The ink-jet recording process according to claim 7, wherein said ink composition is jetted in the form of droplets by utilizing the vibration of a piezoelectric device.

9. The ink-jet recording process according to claim 7, wherein said ink composition is jetted in the form of droplets by the action of heat energy.

* * * * *